US010563131B2

United States Patent
Chaumonnot et al.

(10) Patent No.: US 10,563,131 B2
(45) Date of Patent: *Feb. 18, 2020

(54) METHOD FOR SYNTHESIZING HYDROCARBONS FROM A SYNGAS IN THE PRESENCE OF A COBALT CATALYST TRAPPED IN A MESOPOROUS OXIDE MATRIX AND OBTAINED FROM AT LEAST ONE COLLOIDAL PRECURSOR

(71) Applicant: IFP Energies nouvelles, Rueil-Malmaison (FR)

(72) Inventors: Alexandra Chaumonnot, Lyons (FR); Antoine Fecant, Brignais (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,508

(22) PCT Filed: Nov. 7, 2016

(86) PCT No.: PCT/EP2016/076878
§ 371 (c)(1),
(2) Date: May 23, 2018

(87) PCT Pub. No.: WO2017/089110
PCT Pub. Date: Jun. 1, 2017

(65) Prior Publication Data
US 2018/0346822 A1    Dec. 6, 2018

(30) Foreign Application Priority Data

Nov. 23, 2015  (FR) ..................... 15 61269

(51) Int. Cl.
| | | |
|---|---|---|
| C10G 2/00 | (2006.01) | |
| B01J 23/75 | (2006.01) | |
| B01J 37/00 | (2006.01) | |
| B01J 21/08 | (2006.01) | |
| B01J 37/02 | (2006.01) | |
| B01J 37/04 | (2006.01) | |
| B01J 37/08 | (2006.01) | |

(52) U.S. Cl.
CPC .............. C10G 2/332 (2013.01); B01J 21/08 (2013.01); B01J 23/75 (2013.01); B01J 37/0045 (2013.01); B01J 37/0201 (2013.01); B01J 37/04 (2013.01); B01J 37/08 (2013.01)

(58) Field of Classification Search
None
See application file for complete search history.

(56) References Cited

U.S. PATENT DOCUMENTS

| | | | |
|---|---|---|---|
| 6,569,318 B2 | 5/2003 | Harle | |
| 6,977,273 B2 | 12/2005 | Roy Auberger | |
| 7,070,690 B2 | 7/2006 | Harle | |
| 7,560,412 B2 | 7/2009 | Osbourne | |
| 2014/0005031 A1 | 1/2014 | Chaumonnot | |
| 2016/0016154 A1* | 1/2016 | Richard ............... | B01J 35/1061 518/715 |

FOREIGN PATENT DOCUMENTS

| | | |
|---|---|---|
| EP | 1233011 A1 | 8/2002 |
| FR | 2969509 A1 | 6/2012 |
| WO | 2006020648 A1 | 2/2006 |

OTHER PUBLICATIONS

Hong, J. et al. "Effect of promotion with ruthenium on the structure and catalytic performance of mesoporous silica (smaller and larger pore) supported cobalt Fischer-Tropsch catalysts" Catalysis Today 140 (2009) 135-141 (Year: 2009).*
Jung (Jung, J-S. et al. Fischer-Tropsch Synthesis over cobalt based catalyst supported on different mesoporous silica Catalysis Today 185 (2012) 168-174 (Year: 2012).*
Osakoo, N. et al. "Effect of support morphology and Pd promoter on Co/SBA-15 for Fischer-Tropsch Synthesis" Catalysis Communications 56 (2014) 168-173 (Year: 2014).*
International Search Report PCT/EP2016/076878 dated Jan. 26, 2017.

* cited by examiner

*Primary Examiner* — Medhanit W Bahta
(74) *Attorney, Agent, or Firm* — Millen, White, Zelano and Branigan, P.C.

(57) ABSTRACT

A process for the synthesis of linear paraffinic hydrocarbons from a feed comprising carbon monoxide and dihydrogen in the presence of a mesoporous oxide matrix and cobalt prepared by
  mixing, at least one molecular precursor of cobalt and at least one colloidal precursor of mesoporous oxide matrix and by silicon, aluminium, titanium, zirconium, cerium or mixtures thereof, dissolved in aqueous or hydro-organic solvent;
  spray drying the mixture obtained to form spherical liquid droplets;
  drying the droplets to obtain solid particles
  activating the solid particles by reduction to form nanoparticles of cobalt with an oxidation state of 0.

12 Claims, No Drawings

METHOD FOR SYNTHESIZING HYDROCARBONS FROM A SYNGAS IN THE PRESENCE OF A COBALT CATALYST TRAPPED IN A MESOPOROUS OXIDE MATRIX AND OBTAINED FROM AT LEAST ONE COLLOIDAL PRECURSOR

TECHNICAL FIELD OF THE INVENTION

The present invention relates to the field of Fischer-Tropsch (FT) processes, i.e. to processes for the synthesis of hydrocarbons from synthesis gas. More particularly, the present invention relates to a process for the synthesis of hydrocarbons from synthesis gas using a catalyst based on the element cobalt trapped in a mesoporous oxide matrix and obtained from at least one molecular precursor.

PRIOR ART

Fischer-Tropsch processes can be used to obtain a wide range of hydrocarbon cuts from a mixture of $CO+H_2$, commonly known as synthesis gas. The overall equation for Fischer-Tropsch synthesis can be written as follows:

$$n CO + (2n+1)H_2 \rightarrow C_nH_{2n+2} + nH_2O$$

Fischer-Tropsch synthesis is at the heart of processes for the conversion of natural gas, coal or biomass into fuels or intermediates for the chemical industry. These processes are known as GTL ("Gas to Liquids") when natural gas is used as the initial feed, CTL ("Coal to Liquids") for coal, and BTL ("Biomass to Liquids") for biomass.

In each case, the initial feed is initially gasified into synthesis gas, a mixture of carbon monoxide and dihydrogen. The synthesis gas is then mainly transformed into paraffins using the Fischer-Tropsch synthesis, these paraffins then possibly being transformed into fuels using a hydroisomerization-hydrocracking process. As an example, transformation processes such as hydrocracking, dewaxing and hydroisomerization of heavy cuts (C16+) can be used to produce various types of fuels in the middle distillate range: gas oil (180-370° C. cut) and kerosene (140-300° C. cut). The lighter C5-C15 fractions may be distilled and used as solvents.

The Fischer-Tropsch synthesis reaction may be carried out in various types of reactors (fixed bed, moving bed or three-phase (gas, liquid, solid), for example of the continuously stirred autoclave type, or bubble column type) and the reaction products have the particular characteristic of being free from sulphur-containing, nitrogen-containing or aromatic type compounds.

In one implementation in a bubble column type reactor (or "slurry bubble column"), which can be simplified to "slurry"), the catalyst is characteristically employed by dividing it into a very fine powder state, typically of the order of a few tens of micrometres, that powder forming a suspension with the reaction medium.

The Fischer-Tropsch reaction is conventionally carried out between 1 and 4 MPa (10 to 40 bar) at temperatures which are traditionally between 200° C. and 350° C. The reaction is exothermic overall, meaning that particular attention has to be paid to how the catalyst is used.

The catalysts employed for the Fischer-Tropsch synthesis are essentially catalysts based on cobalt or iron, although other metals can be used. However, cobalt and iron offer a good performance/price compromise compared with other metals.

Conventional methods for the preparation of supported metallic catalysts used for the Fischer-Tropsch synthesis consist of depositing a precursor of the active phase (metallic salt or metal-ligand coordination complex) on an oxide support (generally from the alumina family), then carrying out an activation step consisting of one or more heat treatment(s) carried out in air and/or in hydrogen. More specifically, the processes for the preparation of such catalysts necessitate many steps which may be summarized as follows: synthesis of the oxide support (for example using the "spray drying" synthesis process, resulting in the production of powders which are compatible with a "slurry" type implementation), one or more impregnation step(s) in order to deposit the metallic precursor, optionally one or more step(s) for drying and/or calcining in air and, finally, one or more activation (reduction) step(s). Each of those steps plays a role in the performances of the resulting catalyst in terms of activity, selectivity and stability under the operating conditions of the process. In particular, the content, size, accessibility and thus the dispersion of the metallic active phase will depend on parameters such as: the nature and solubility of the metallic precursor, the textural and surface properties of the pre-formed oxide support and the operating parameters for the impregnation in order to control the metallic precursor/surface of the oxide support interactions.

In order to make Fischer-Tropsch synthesis processes competitive compared with other processes for the synthesis of hydrocarbons which have a higher yield but are less attractive ecologically (processes for the transformation of fossil resources), one possible route to improvement consists of simplifying the conventional methods for obtaining FT catalysts described above, while maintaining (or even increasing) the associated catalytic performances. Such a simplification could be used to make substantial savings in terms of the starting materials used, the energy consumed, the production of waste, the size-to-capacity ratio of the process, and thus would apply the concept of "process intensification" to the field of Fischer-Tropsch synthesis.

For about a decade now, the scientific community has been focussing on an original synthesis methodology combining "sol-gel" chemistry with specific synthesis processes such as atomization (also known as "spray drying"), the deposition of thin films (also known as "spin coating"), etc. That approach has not only provided access to innovative oxide supports for catalysis, but has also provided a "direct" method for the synthesis of catalysts which dispenses with the usual "synthesis of oxide support+deposit of precursor of active phase" combination. The review which appeared in *Advanced Materials* (2011, 23, 599) provides an overall view of the work carried out in this regard over the past few years. As an example, pre-formed metallic nanoparticles (NP) formed from gold, oxides of titanium, iron or caesium have thus been incorporated directly during the synthesis of the mesoporous silicon-containing oxide matrix, this latter usually being obtained using a distinct process leading to what is known as the "support". This approach has been successfully used to obtain hydrotreatment, hydrocracking and hydroconversion catalysts (FR 2 886 636, FR 2 969 509, FR 2 969 511, FR 2 969 514, FR 2 969 513) or metathesis catalysts (FR 2 977 890). It has, however, not been explored to a great extent for the development of FT catalysts. One explanation for this is probably linked to the complexity of such a methodology. In fact, the reactivity of each metallic element is relevant to its nature, to the selected precursors and to the chemical environment imposed by the synthesis medium (solvent, concentration, pH, temperature, organic and/or inorganic additives, etc) and the process employed (process parameters such as the flow rates (feed and vector gas), the spray drying temperature, the technology of the nozzle generating the aerosol, etc). As a consequence, the development of novel solids in terms of chemical formulation and the intrinsic properties expected for a specific application, is not a trivial matter.

Zeng et al., *Journal of Aerosol Science*, 2014, 76, 1, mentions the synthesis of a potential catalyst for the application (FT). In their work, pre-formed nanoparticles of cobalt oxide are added to a suspension resulting from a mixture of colloidal sols of silica (pre-formed nanoparticles of silica) and an organic polymer used as a generator of the porosity. Zeng et al. indicate that disappointing results are obtained, in particular a poor dispersion of the element cobalt, starting from cobalt precursors in solution. That strategy, although it is a precursor in the "direct" synthesis of catalysts based on cobalt, suffers from the major disadvantage of operating with pre-formed nanoparticles of $Co_3O_4$, because obtaining them is difficult, lengthy to carry out (a plurality of synthesis steps) and of low compatibility with industrial production (low yield, high solvent consumption, severe operating constraints in order to ensure stability of such colloidal sols, etc). In addition, employing pre-formed nanoparticles based on Co and silica limits the reactivity of the species to interactions between nanoparticles and does not involve the chemistry of molecular precursors (or lead to molecular species) which is much finer and versatile in terms of potentiality of the materials. Finally, no test associated with the FT application has proved the efficiency of such solids for this application.

WO2006/020648 A1 discloses a process for the preparation of a catalyst and its application in the Fischer-Tropsch process. The catalyst is prepared by spray drying a liquid-solid mixture (slurry) comprising a precursor of cobalt, alumina powder and a peptizing agent which could be aluminium nitrate, the peptizing agent being used to provide a better dispersion of the alumina. This implementation requires that the alumina powder be pre-formed and the mixture be diluted with water in order to allow it to be pumped and spray dried. In addition, the use of pre-formed alumina again limits the potential interactions between the active phase and the oxide matrix to cobalt precursor-oxide surface interactions.

SUMMARY OF THE INVENTION

The invention concerns a process for the synthesis of linear paraffinic hydrocarbons from a feed comprising carbon monoxide and dihydrogen in the presence of a catalyst comprising a mesoporous oxide matrix and a content by weight of the element cobalt in the range 0.5% to 60%, expressed as the % by weight of metal with respect to the total weight of said catalyst, said catalyst being prepared in accordance with a process comprising at least the steps of:
  a) mixing, in an aqueous or hydro-organic solvent, at least one molecular precursor comprising cobalt and at least one colloidal precursor of said mesoporous oxide matrix comprising at least one element X selected from the group constituted by silicon, aluminium, titanium, zirconium, cerium and mixtures thereof, said molecular precursor comprising cobalt being dissolved in said aqueous or hydro-organic solvent;
  b) spray drying the mixture obtained in step a) in order to result in the formation of spherical liquid droplets;
  c) drying said spherical droplets in order to obtain solid particles at a temperature in the range 10° C. to 300° C.;
  d) activation of said solid particles by means of a reduction treatment in a manner such as to form nanoparticles of cobalt with an oxidation state of 0.

Advantage of the Invention

In one aspect, the invention proposes a process for the synthesis of paraffin hydrocarbons (Fischer-Tropsch process) in the presence of a catalyst prepared in accordance with a preparation process which exhibits an unprecedented simplification of the process for the production of catalyst which is conventionally employed in the Fischer-Tropsch process, which means that the cost of the production of the synthetic hydrocarbons obtained can be reduced and the ever more drastic environmental constraints of recent decades can be complied with. This simplification is achieved by developing a process for the preparation of said catalyst by spray drying which can be used to completely or partially incorporate at least one precursor of the active phase, i.e. at least one precursor of the element cobalt, during the formation of the mesoporous oxide matrix, which matrix normally being termed the "support" in conventional synthesis methods.

The process for the preparation of the catalyst used in accordance with the invention exploits the potential of sol-gel chemistry, and in particular the chemistry inherent to the reactivity of molecular precursors comprising cobalt, in solution, and colloidal solutions, which differs from the chemistry that occurs between a precursor and a pre-formed solid, gelled or precipitated, or two pre-formed solids, irrespective of whether that solid is in the form of nanoparticles of cobalt, silica or alumina, in particular with interactions which are much more intimate because of the size of the molecules and nanoparticles which are present. In fact, in the present invention, the direct incorporation of at least one precursor of the active phase during the synthesis of the mesoporous oxide matrix, itself generated from at least one colloidal precursor, can be used to modify the "active phase precursors/pre-formed surface of the oxide support" interactions which usually control the content, size, accessibility and thus the dispersion, of said active phase. The collective mixture of at least one molecular precursor of the element cobalt with at least one colloidal precursor of said mesoporous oxide matrix comprising at least one element X selected from the group constituted by silicon, aluminium, titanium, zirconium, cerium and mixtures thereof, combined with the spray drying process, in the end results in materials with different catalytic performances compared with their homologues obtained using more conventional methodologies.

DESCRIPTION OF THE INVENTION

FT Synthesis Process

The process for the synthesis of linear paraffinic hydrocarbons, also termed the Fischer-Tropsch process, can be used to produce essentially linear, saturated $C5^+$ hydrocarbons. In accordance with the invention, the term "essentially linear, saturated $C5^+$ hydrocarbons" means hydrocarbons for which the proportion of hydrocarbon compounds containing at least 5 carbon atoms per molecule represents at least 50% by weight, preferably at least 80% by weight of the entirety of the hydrocarbons formed, the total content of olefinic compounds present in said hydrocarbon compounds containing at least 5 carbon atoms per molecule being less than 15% by weight. The hydrocarbons produced by the process of the invention are thus hydrocarbons which are essentially paraffinic, wherein the fraction with the highest boiling points may be converted with a high yield into middle distillates (gas oil and kerosene cuts) by a catalytic hydroconversion process such as hydrocracking and/or hydroisomerization.

Preferably, the feed used to carry out the process of the invention is constituted by synthesis gas, which is a mixture of carbon monoxide and hydrogen with $H_2/CO$ molar ratios which may vary between 0.5 and 4 depending on the production process from which it is obtained. The $H_2/CO$ molar ratio of synthesis gas is generally close to 3 when the synthesis gas is obtained from a process for steam reforming hydrocarbons or alcohol. The $H_2/CO$ molar ratio of synthesis gas is of the order of 1.5 to 2 when the synthesis gas is obtained from a partial oxidation process. The $H_2/CO$ molar ratio of synthesis gas is generally close to 2.5 when it is obtained from an autothermal reforming process. The $H_2/CO$ molar ratio of synthesis gas is generally close to 1 when it is obtained from a process for the gasification and reforming of hydrocarbons with $CO_2$ (known as dry reforming).

The Fischer-Tropsch process in accordance with the invention is operated at a total pressure in the range 0.1 to 15 MPa, preferably in the range 0.5 to 10 MPa, at a temperature in the range 150° C. to 350° C., preferably in the range 180° C. to 270° C. The hourly space velocity is advantageously in the range 100 to 20000 volumes of feed, advantageously synthesis gas, per volume of catalyst and per hour (100 to 20000 $h^{-1}$), and preferably in the range 400 to 10000 volumes of synthesis gas per volume of catalyst per hour (400 to 10000 $h^{-1}$), the volume of feed being measured at 25° C. and 0.1 MPa.

The Fischer-Tropsch process in accordance with the invention may be carried out in a continuously stirred autoclave type, ebullated bed, bubble column, fixed bed or moving bed reactor. It is preferably carried out in a bubble column type reactor.

For this reason, the size of the grains of catalyst used in the Fischer-Tropsch process may be between a few microns and 2 millimetres. Typically, to operate in a three-phase "slurry" reactor (bubble column), the catalyst is finely divided and is in the form of particles. The size of the particles of catalyst will be in the range 10 to 500 micrometres (μm), preferably in the range 10 to 300 μm and highly preferably in the range 20 to 150 μm, and yet more preferably in the range 20 to 120 μm.

Process for the Preparation of the Catalyst Used in Accordance with the Invention In accordance with the invention, the process for the synthesis of linear paraffinic hydrocarbons is carried out in the presence of a catalyst comprising a mesoporous oxide matrix and a content by weight of the element cobalt in the range 0.5% to 60%, expressed as the % by weight of metal with respect to the total weight of said catalyst, said catalyst being prepared in accordance with a preparation process comprising at least the steps of:

a) mixing, in an aqueous or hydro-organic solvent, at least one molecular precursor comprising cobalt and at least one colloidal precursor of said mesoporous oxide matrix comprising at least one element X selected from the group constituted by silicon, aluminium, titanium, zirconium, cerium and mixtures thereof, said molecular precursor comprising cobalt being dissolved in said aqueous or hydro-organic solvent;

b) spray drying the mixture obtained in step a) in order to result in the formation of spherical liquid droplets;

c) drying said spherical droplets in order to obtain solid particles at a temperature in the range 10° C. to 300° C.;

d) activation of the solid particles obtained from step c) (optionally from step c1)) by means of a reduction treatment, advantageously in pure or diluted hydrogen, at high temperature, in a manner such as to form particles of cobalt with an oxidation state of zero, i.e. in the metallic form, namely the active phase of the catalyst used in accordance with the invention.

Said oxide matrix is mesoporous, i.e. it is characterized by pores the size of which is in the range 2 to 50 nm in accordance with the IUPAC classification (K. S. Sing et al., *Pure Appl. Chem.*, 1985, 57, 603). In addition to being mesoporous, said matrix may be mesostructured, i.e. have mesopores with a uniform size distributed in a periodic manner in said matrix, or in fact have a hierarchical porosity (presence of micropores and/or macropores in addition to mesopores). Highly preferably, the mesoporous oxide matrix of the catalyst used in accordance with the invention is an amorphous silica without micropores.

The term "molecular precursor comprising the element cobalt" means any compound comprising the element cobalt and which can release this element in solution in the reactive form, i.e. usually in a monomeric form, a monomer being considered in inorganic synthesis to be an entity existing on a molecular scale and which is capable of undergoing condensation reactions leading to the production of an oxide phase. Thus, at least one molecular precursor of the element cobalt is advantageously a salt, a coordination complex, a (hydr)oxide, etc. By way of non-exhaustive example, the following cobalt salts may be employed: $Co(NO_3)_2$ (nitrate), $CoZ_z$ in which Z=Cl, Br, I, F and z=2 or 3 (halides), $CoCO_3$ (carbonate), $CoSO_4$ (sulphate), $Co_3PO_4$ (phosphate), $Co(OOCCH_3)_2$ (acetate), $Co(CH_3COCHCOCH_3)_2$ (acetylacetonate), $Co_3(C_6H_5O_7)_2$ (citrate), $Co(C_2O_4)$ (oxalate) etc. Similarly, and still by way of example, coordination complexes $Co_2(CO)_8$ (dicobalt octacarbonyl) and $Co(NH_3)Cl_3$ may be used. It is also possible to use the hydroxide $Co(OH)_2$ and oxides of cobalt, provided that taking them up into solution ensures the formation of the monomeric reactive species mentioned above (using particular operating conditions such as pH, temperature, solvents), i.e. that said oxide or hydroxide does not remain in the solid form but dissolves in the mixture.

The molecular precursor comprising cobalt is dissolved in said aqueous or hydro-organic solvent, advantageously completely dissolved. The term "dissolved" means that the precursor is dissolved, or mixed if it is already a liquid, in the solvent in order to form a homogeneous mixture. If a plurality of precursors comprising cobalt is used, each precursor is dissolved.

The term "colloidal precursor of said mesoporous oxide matrix comprising at least one element X" means a suspension of particles comprising at least said element X dispersed in a homogeneous manner in a liquid solution. The dimensions, characteristics of said particles are from a nanometre to just below a micrometre, said particles still formally being termed nanoparticles. Thus, the colloidal solutions (or sols or colloidal suspensions) may be considered to be intermediate between suspensions (particles with a size of more than a micrometre) and true solutions (particles with a size below a nanometre). Similarly, the colloidal solutions, although constituted on a nanometric scale by two phases (solid-liquid), have a homogeneous monophase appearance of true solutions without the phenomenon of precipitation/gelling/sedimentation/flocculation, etc which occurs with suspensions. This also results in a specific chemistry, the reactivity of the surface of the solid nanoparticles being intermediate between those of the molecular precursors and of preformed solid (gelled) precipitates. In addition, the nanometric dimensions of the objects under consideration has a considerable impact on the degree of mixing obtained with at least one molecular precursor comprising the element cobalt, compared with the use of a molecular precursor of at least one element X or of a pre-formed precipitated (gelled) oxide of at least said element X.

Preferably, the size of the particles forming the colloidal precursor is in the range 1 nm to 500 nm, highly preferably in the range 2 to 100 nm. The particles containing at least the element X are preferably in the oxide form. Preferably, the element X is selected from the group constituted by silicon, aluminium, and mixtures thereof. More preferably, the element X is silicon. The solution dispersing said particles is aqueous, organic or hydro-organic. Preferably, the solution is aqueous. Similarly, the pH of the solution may be neutral, acidic or basic. Preferably, the pH of the solution is neutral or acidic. The colloidal precursors are also characterized by methodologies for the synthesis and use of reagents which depend on the nature of said colloidal source, which generates the possible presence of impurities in the final sol such as the elements sodium, iron, etc. Preferably, the colloidal precursors employed have an impurities content of less than 3000 ppm, highly preferably less than 1000 ppm and more preferably less than 300 ppm with respect to the weight of dry matter constituting the sol. The colloidal precursors may be synthesized using methods which are well known to the person skilled in the art or which might even be commercial methods. Commercial sources of colloids may appear in the following non-exhaustive list: Nyacol (family of sols available from Nyacol Nano Technologies, Inc.), Ludox (family of sols available from W. R. Grace and Company), Klebosol (family of sols available from Merck), Ultra-sol (family of sols available from Eminess Technologies), and Nalco (family of sols available from Nalco).

Advantageously, for only the colloidal precursors of said mesoporous oxide matrix, said mixture in accordance with said step a) comprises colloidal precursors comprising the element silicon. The mesoporous oxide matrix obtained is then constituted by silica.

Advantageously, said mixture in accordance with said step a) comprises, as the only colloidal precursors of said mesoporous oxide matrix, colloidal precursors comprising the element silicon and colloidal precursors comprising the element aluminium, in a manner such that the silica content is in the range 0.5% to 95% by weight with respect to the total weight of said oxide matrix obtained, preferably in the range 0.5% to 30% by weight, more preferably in the range 1% to 30% by weight, and highly preferably in the range 1.5% to 20% by weight. Using routine tests, the person skilled in the art will adjust the quantity of molecular precursor in a manner such as to arrive at the desired content, adding precursors to the mixture when the content obtained is too low, and removing precursors from the mixture when the content obtained is too high. The mesoporous oxide matrix obtained is then constituted by an aluminosilicate, i.e. a mixture of the elements silicon and aluminium.

The mixture at the end of step a) of said process for the preparation of the catalyst used in accordance with the invention is a colloidal mixture (also termed a sol or colloidal suspension) supplemented with molecular precursors, which is visually monophase, i.e. the objects in said mixture have a size below one micrometre. It is neither a true solution nor a suspension, nor a slurry.

The term "hydro-organic solvent" means a solution of a mixture of water and an organic solvent. Preferably, the hydro-organic solvent is a hydro-ethanolic solution. Preferably, the mixture in accordance with said step a) is produced in an aqueous solvent, said mixture being clear and with a neutral, basic or acidic pH, preferably acidic.

Furthermore, incorporating at least one molecular precursor of the element cobalt may necessitate dissolving the latter prior to said step a), said composition then being introduced into the mixture of said step a). Preferably, the solvent used to dissolve at least one molecular precursor of the element cobalt is identical to at least one of the solvents used for the mixture of said step a).

Advantageously, said mixture in accordance with step a) also comprises at least one surfactant.

In the case in which a surfactant is used for the preparation of the mixture in accordance with step a) of the process for the preparation of the material in accordance with the invention, this latter usually being used as an agent for structuring the porosity, said surfactant may be selected from any surfactant which is well known to the person skilled in the art. In particular, it may be ionic or non-ionic, or a mixture of the two. Preferably, the ionic surfactant is selected from phosphonium and ammonium ions, and highly preferably from quaternary ammonium salts such as cetyl-trimethylammonium bromide (CTAB). Preferably, the non-ionic surfactant may be any (co)polymer with at least two portions with different polarities which provides them with amphiphilic macromolecular properties. Preferably, in the context of the present invention, a block copolymer is used which is constituted by chains of poly(alkylene oxide), including chains of poly(propylene oxide), denoted (PPO) and chains of poly(ethylene oxide), denoted (PEO). Highly preferably, a compound with formula $(PEO)_w$-$(PPO)_y$-$(PEO)_z$ is used, in which w is in the range 5 to 300 and y is in the range 33 to 300 and z is in the range 5 to 300. Preferably, the values for w and z are identical. Highly advantageously, a composition is used in which w=20, y=70 and z=20 (P123) and a compound in which w=106, y=70 and z=106 (F127) is used. Commercial non-ionic surfactants known by the names of Pluronic (BASF), Tetronic (BASF), Triton (Sigma), Tergitol (Union Carbide), Brij (Aldrich) may be used as non-ionic surfactants. As the person skilled in the art will be aware, pore-forming agents may be used, in particular in order to obtain micropores. Preferably, said mixture in accordance with step a) does not comprise a surfactant.

Advantageously, said mixture in accordance with step a) also comprises at least one molecular precursor comprising at least one element Y selected from the group constituted by silicon, aluminium, titanium, zirconium, cerium and mixtures thereof.

In the case in which at least one molecular precursor comprising at least one element Y is used, the term "molecular precursor" means any compound comprising the element Y which can release that element in solution in the reactive form, i.e. usually in the monomeric form, a monomer in inorganic synthesis being considered to be an entity existing on a molecular scale and which is capable of undergoing condensation reactions, resulting in the production of an oxide phase. Thus, a molecular precursor of the element Y may advantageously be an inorganic salt of said element Y with formula $YN_n$, (n=3 or 4), N being a halogen, the group $NO_3$, a perchlorate or a sulphate. The precursor of said element Y may also be an alkoxide precursor with formula $Y(OR)_n$ in which R=ethyl, isopropyl, n-butyl, s-butyl, t-butyl, etc. or a chelated precursor such as $Y(C_5H_8O_2)_n$, in which n=3 or 4. The precursor of said element Y may also be an oxide or a hydroxide of said element Y, provided that dissolving it provides for the formation of the reactive monomeric species mentioned above, i.e. said oxide or hydroxide does not remain in the solid form, but dissolves in the mixture. The element Y constituting the molecular precursor is selected from the group constituted by silicon, aluminium, titanium, zirconium, cerium and mixtures thereof. Preferably, the element Y is selected from the group constituted by silicon, aluminium and mixtures thereof. More preferably, the element Y is silicon. In the case in which Y is silicon, the silicon precursor is advantageously the sodium silicate precursor with formula $Na_2SiO_3$, the chloride precursor with formula $SiCl_4$, an alkoxide precursor with formula $Si(OR)_{4-a}R'_a$ in which R=H, methyl or ethyl, and R' is an alkyl chain or a functionalized alkyl chain, for example a thiol, amino, β-diketone or sulphonic acid group, "a" being in the range 0 to 4, or an alkoxychloride precursor with formula $Si(OR)_{4-a}Cl_a$ in which R=H, methyl or ethyl, "a" being in the range 0 to 4. A preferred silicon precursor is tetraethylorthosilicate (TEOS). In the case in which Y is aluminium, the aluminium precursor is advantageously the precursor of an inorganic aluminium salt with formula $AlN_3$, N being a halogen or the $NO_3$ group. Preferably, N is a nitrate. The aluminium precursor may also be an inorganic aluminium salt with formula $Al_2N'_3$, N' being the sulphate group $SO_4$. The aluminium precursor may also be an alkoxide precursor with formula $Al(OR'')_3$ in which R''=ethyl, isopropyl, n-butyl, s-butyl or t-butyl, or a chelated precursor such as aluminium acetylacetonate $(Al(C_5H_7O_2)_3)$. The aluminium precursor may also be an oxide or a hydroxide of aluminium, for example A100H.

The molar ratio X/Y in the form of the associated oxides will preferably be more than 1, more preferably more than 10. Advantageously, said mixture in accordance with step a) does not include a molecular precursor comprising at least one element Y selected from the group constituted by silicon, aluminium, titanium, zirconium, cerium and mixtures thereof.

Step b) for spray drying the mixture obtained from step a) results in the formation of spherical droplets (aerosol). The mixture obtained in step a) of the preparation process is mixed with a first vector gas (air, nitrogen, etc) and as a whole it produces an aerosol after passage through the ultrasonic nozzle.

Step c) of the process for the preparation of the catalyst used in accordance with the invention is drying of said droplets at a temperature in the range 10° C. to 300° C. Contact of the droplets with a second vector gas heated to a controlled temperature means that they can be simultaneously conveyed and the solvent(s) used can gradually be evaporated off in order to form the mixture of step a) of thermal and thus to obtain solid particles, generally spherical. A complementary drying step may be envisaged, for example via passage through an oven (or equivalent) at a temperature in the range 50° C. to 130° C.

Advantageously, said preparation process comprises a step c1) for heat treatment of the solid particles obtained from step c) and carried out upstream of step d) in a manner such as to remove residual water and volatile compounds, in a temperature range of 130° C. to 1000° C., preferably in the range 250° C. to 600° C., and more preferably in the range 350° C. to 500° C. for a period of less than 72 h and preferably less than 24 h. This latter is conventionally calcining in air, carried out in a flushed bed, fluidized bed, trickle bed or in a static atmosphere.

In a first particular embodiment of the process for the preparation of the catalyst used in accordance with the invention, just before step d), a step c') for hydrothermal treatment of the solid particles obtained from step c), optionally obtained from step c1), is carried out. The technical effect of this step is to increase the quantity of active cobalt to the detriment of the quantity of cobalt in the form of the silicate or aluminate, for example, which is inactive having regard to the reactions occurring in the Fischer-Tropsch process.

In said step c') of the first particular embodiment of the process for the preparation of the catalyst used in accordance with the invention, the solid particles obtained from step c) of the process is treated in steam at a temperature in the range 110° C. to 900° C., preferably in the range 110° C. to 450° C., more preferably in the range 110° C. to 250° C., for a period which is preferably from 30 minutes to 12 hours and with an air/steam mixture, said mixture comprising in the range 2% to 80% (molar) of water in the form of steam, preferably in the range 20% to 50% of water.

In a second particular embodiment of the process for the preparation of the catalyst used in accordance with the invention, just before step d), a step c'') for impregnation of the solid particles obtained from step c) or from step c') is carried out using an aqueous or organic solution comprising at least one salt of a metal from group VIIIB selected from the group constituted by cobalt, nickel, ruthenium and iron, preferably cobalt, with drying of the product obtained at a temperature in the range 60° C. to 200° C. This step may be used to obtain the desired weight content of the element cobalt in the final catalyst.

Said step c'') may advantageously be carried out by dry impregnation, by excess impregnation or also by deposition-precipitation using methods which are well known to the person skilled in the art. Preferably, said impregnation step is carried out by dry impregnation, preferably at ambient temperature. Said impregnation step consists of bringing the solid particles obtained from step c) into contact with at least one solution containing at least one precursor of said metal from group VIIIB, the volume of which is equal to the pore volume of said particles to be impregnated. This solution contains the metallic precursor of the metal or metals from group VIIIB to the desired concentration for obtaining the envisaged final metal content on the catalyst, advantageously a metal content in the range 0.5% to 60% by weight, and preferably in the range 5% to 30% by weight with respect to the weight of catalyst. The metal or metals from group VIIIB are brought into contact with said solid particles via any metallic precursor which is soluble in the aqueous phase or in the organic phase. When it is introduced in organic solution, the precursor of the metal from group VIIIB is preferably the oxalate or acetate of said metal from group VIIIB. Preferably, the precursor of the metal from group VIIIB is introduced in aqueous solution, preferably in the form of the nitrate, carbonate, acetate, chloride, oxalate, complexes formed by a polyacid or an acid-alcohol and its salts, complexes formed with acetylacetonates, or any other inorganic derivative which is soluble in aqueous solution, which is brought into contact with said solid particles. In the preferred case in which the metal from group VIIIB is cobalt, the cobalt precursor which is advantageously used is cobalt nitrate, cobalt oxalate or cobalt acetate. Most preferably, the precursor used is cobalt nitrate. The at least one salt of the metal from group VIIIB may be impregnated in a single or in a plurality of impregnation steps. In the case of high metal contents, impregnation in two steps or even in three steps is preferred. At the end of each of the impregnation steps, at least one optional supplemental step for drying and/or calcining and/or steam treatment is preferably carried out, the latter treatment being as described for step c'). The catalyst precursor obtained in this manner is then dried. Drying is advantageously carried out at a temperature in the range 60° C. to 200° C., preferably for a period of 30 minutes to 48 hours.

In accordance with step d) of the process for the preparation of the catalyst used in accordance with the invention, the activation of the solid particles obtained from step c), advantageously obtained from step c1), from step c') or from step c''), is carried out with the aid of a reduction treatment. Said activation or said reduction treatment may be carried out in situ (in the same reactor as that in which the Fischer-Tropsch synthesis is carried out) or ex situ before being charged into the Fischer-Tropsch synthesis reactor. The temperature of this reduction treatment is preferably in the range 200° C. to 600° C. and its duration is generally in the range 2 to 20 hours.

This step can be used to reduce at least a fraction of the cobalt present in said catalyst into metallic cobalt, i.e. with an oxidation state of 0.

At least one element selected from groups VIIB, IA (i.e. an alkali element), IIA (i.e. an alkaline-earth element), IIIA, and the elements Rh, Pd, Ag, Os, Ir, Pt, Au, alone or as a mixture, is advantageously added to the mixture of step a) and/or during the impregnation step c") of the process for the preparation of catalyst carried out in the process of the invention in a manner such that said catalyst will comprise a content by weight of said at least one element which is in the range 20 ppm to 10%, preferably in the range 50 ppm to 5%, expressed as a % by weight of the element with respect to the total mass of said catalyst.

Description of the Catalyst

The preparation process described above may be used to obtain a catalyst comprising a mesoporous oxide matrix and at least the element cobalt, said element being incorporated during the formation of said matrix by means of at least one molecular precursor comprising cobalt and at least one colloidal precursor of said mesoporous oxide matrix comprising at least one element X selected from the group constituted by silicon, aluminium, titanium, zirconium, cerium and mixtures thereof.

The catalyst comprises a content by weight of the element cobalt which is in the range 0.5% to 60%, expressed as a % by weight of metal with respect to the total weight of said catalyst, and preferably in the range 5% to 30% by weight.

Advantageously, the catalyst comprises a content by weight in the range 20 ppm to 10%, expressed as a % by weight of the element with respect to the total weight of catalyst, preferably in the range 50 ppm to 5% by weight, of at least one element selected from the groups VIIB, IA (alkali element), IIA (alkaline-earth element), IIIA, and the elements Rh, Pd, Ag, Os, Ir, Pt, Au, alone or as a mixture.

The catalyst is characterized by a specific surface area which is generally in the range 50 to 600 m$^2$/g, preferably in the range 50 to 300 m$^2$/g and more preferably in the range 60 to 200 m$^2$/g, by a pore volume which is generally in the range 0.1 to 1 mL/g, preferably in the range 0.2 to 0.9 mL/g and more preferably in the range 0.3 to 0.8 mL/g, and by a pore diameter which is generally in the range 2 to 50 nm and preferably in the range 9 to 30 nm.

The catalyst may have a morphology which is in the form of beads, extrudates (for example with a trilobal or quadrilobal shape) or pellets, in particular when said catalyst is used in a reactor operating in fixed bed mode, or has a morphology in the form of a powder with a variable granulometry, in particular when said catalyst is used in a reactor of the bubble column type. Preferably, the catalyst used in accordance with the invention has a morphology in the form of a powder with a variable granulometry.

In order to illustrate the invention and to enable the person skilled in the art to carry it out, we shall now describe various embodiments of the process for the preparation of a catalyst used for the Fischer-Tropsch synthesis; however, these should not limit the scope of the invention.

EXAMPLES

In the examples below, the aerosol technique used was that described above in the disclosure of the invention. The catalysts were activated ex situ prior to the catalytic tests which represent the FT synthesis process. The spray dryer used was a commercial B290 apparatus supplied by Buchi, having an ultrasound spray drying nozzle.

Example 1 [Equates to the Preparation of the Catalyst Used in Accordance with the Invention]

Preparation of non-activated catalyst A comprising 15% by weight of the element Co with respect to the total weight of catalyst and a mesoporous silica matrix obtained by incorporating a molecular precursor of the element cobalt, $Co(NO_3)_2$, during the formation of said matrix, the latter resulting from using a commercial Ludox AS 40 type colloidal silica solution.

10.17 g of a solution of colloidal silica of the Ludox AS 40 type (W. R. Grace and Company, 40% by weight of $SiO_2$ in the solution, size of nanoparticles=20-40 nm, pH of 9.1) was added to 71.92 g of a solution of nitric acid with a pH of 2 and 11.04 g of ethanol, with it all being stirred together at ambient temperature for 30 min. 5.23 g of an aqueous solution of cobalt nitrate $Co(NO_3)_2$ (13.4% by weight of the element cobalt) was then added. After 15 min of homogenization, it was sent in its entirety to the Buchi B290 spray drying apparatus. After spraying by means of the ultrasonic nozzle, the aerosol obtained was conveyed and dried by means of a vector gas (dry air) heated to 220° C. at the inlet. The harvested powder was oven dried in addition overnight at 100° C., then calcined in air for 12 h at T=400° C. The non-activated catalyst A obtained was characterized by the following textural properties (by means of a nitrogen volumetric analysis): specific surface area $S_{BET}$=108 m$^2$/g, pore volume $V_p$=0.3 mL/g, and pore diameter (measured using the desorption branch of the isotherm) $\phi$=13.2 nm.

Example 2 [Equates to the Preparation of the Catalyst Used in Accordance with the Invention]

Preparation of non-activated catalyst B comprising 15% by weight of the element Co with respect to the total weight of catalyst and a mesoporous silica matrix obtained by incorporation of the molecular precursor of the element cobalt, $Co(NO_3)_2$, during the formation of said matrix, this latter resulting from using a commercial colloidal silica solution of the Klebosol 30HB25 type.

13.73 g of a solution of colloidal silica of the type Klebosol 30HB25 (Merck, 30% by weight of $SiO_2$ in the solution, size of nanoparticles=25 nm, pH of 2.5) was added to 72.83 g of a solution of nitric acid with a pH of 2 and 11.18 g of ethanol, with it all being stirred together at ambient temperature for 30 min. 5.29 g of an aqueous solution of cobalt nitrate, $Co(NO_3)_2$ (13.4% by weight of the element cobalt) was then added. After 15 min of homogenization, it was sent in its entirety to the Buchi B290 spray drying apparatus. After spraying by means of the ultrasonic nozzle, the aerosol obtained was conveyed and dried by means of a vector gas (dry air) heated to 220° C. at the inlet. The harvested powder was oven dried in addition overnight at 100° C., then calcined in air for 12 h at T=400° C. The non-activated catalyst B obtained was characterized by the following textural properties (by means of a nitrogen volumetric analysis): specific surface area $S_{BET}$=98 m$^2$/g, pore volume $V_p$=0.4 mL/g, and pore diameter (measured using the desorption branch of the isotherm) $\phi$=17.6 nm.

Example 3 [Equates to the Preparation of the Catalyst Used in Accordance with the Invention]

Preparation of non-activated catalyst C comprising 15% by weight of the element Co with respect to the total weight of catalyst and a mesoporous silica matrix obtained by incorporation of the molecular precursor of the element cobalt, $Co(NO_3)_2$, during the formation of said matrix, this latter resulting from using a commercial colloidal silica solution of the Klebosol 30HB25 type and an organic surfactant.

13.12 g of a solution of colloidal silica of the type Klebosol 30HB25 (Merck, 30% by weight of $SiO_2$ in the solution, size of nanoparticles=25 nm, pH of 2.5) was added to 24.35 g of a solution of nitric acid with a pH of 1, with it all being stirred together at ambient temperature for 30 min (solution 1). Previously, 4.48 g of Pluronic P123 was added to 10.68 g of ethanol and 45.21 g of a solution of nitric acid with a pH of 2, with it all being stirred together at ambient temperature for 16 h (solution 2). The solution 1 was then slowly added to the solution 2 containing the dissolved P123. After 10 min of homogenization, 5.05 g of an aqueous solution of cobalt nitrate, $Co(NO_3)_2$ (13.4% by weight of the element cobalt) was finally added. After 15 min of homogenization, it was sent in its entirety to the Buchi B290 spray drying apparatus. After spraying by means of the ultrasonic nozzle, the aerosol obtained was conveyed and dried by means of a vector gas (dry air) heated to 220° C. at the inlet. The harvested powder was oven dried in addition overnight at 100° C., then calcined in air for 12 h at T=400° C. The non-activated catalyst B obtained was characterized by the following textural properties (by means of a nitrogen volumetric analysis): specific surface area $S_{BET}$=101 m$^2$/g, pore volume $V_p$=0.63 mL/g, and pore diameter (measured using the desorption branch of the isotherm) $\phi$=23.3 nm.

Example 4 [Equates to the Preparation of the Catalyst Used in Accordance with the Invention]

Preparation of non-activated catalyst D comprising 15% by weight of the element Co with respect to the total weight of catalyst and a mesoporous silica matrix obtained by incorporating a portion of the molecular precursor of the element cobalt, $Co(NO_3)_2$ during the formation of said matrix, this latter resulting from using a commercial colloidal silica solution of the Klebosol 30HB25 type and a molecular precursor of silica.

13.13 g of a solution of colloidal silica of the Klebosol 30HB25 type (Merck, 30% by weight of $SiO_2$ in the solution, size of nanoparticles=25 nm, pH of 2.5) was added to 24.14 g of a solution of nitric acid with a pH of 1, with it all being stirred together at ambient temperature for 30 min (solution 1). Previously, 2.74 g of TEOS (tetraethylorthosilicate, $Si(OC_2H_5)_4$) was added to 10.69 g of ethanol and 45.34 g of a solution of nitric acid with a pH of 2, with it all being stirred together at ambient temperature for 16 h (solution 2). The solution 1 was then slowly added to the solution 2 containing the dissolved TEOS. After 10 min of homogenization, 5.07 g of an aqueous solution of cobalt nitrate, $Co(NO_3)_2$ (13.4% by weight of the element cobalt) was finally added. After 15 min of homogenization, it was sent in its entirety to the Buchi B290 spray drying apparatus. After spraying by means of the ultrasonic nozzle, the aerosol obtained was conveyed and dried by means of a vector gas (dry air) heated to 220° C. at the inlet. The harvested powder was oven dried in addition overnight at 100° C., then treated with steam (50% molar water/air mixture) for 2 h at 200° C. and finally calcined in air for 12 h at T=400° C. The non-activated catalyst D obtained was characterized by the following textural properties (by means of a nitrogen volumetric analysis): specific surface area $S_{BET}$=160 m$^2$/g, pore volume $V_p$=0.45 mL/g, and pore diameter (measured using the desorption branch of the isotherm) $\phi$=15.5 nm. The molar ratio X/Y, expressed as the respective oxides (silica in this case), was 5.

Example 5 [not Equating to the Preparation of the Catalyst Used in Accordance with the Invention]

Preparation of non-activated catalyst E comprising 15% by weight of the element Co with respect to the total weight of catalyst and a silica matrix obtained by formation of a mesoporous silica oxide matrix then incorporation of a molecular precursor of the element cobalt, $Co(NO_3)_2$, by dry impregnation of the solid obtained during the first step.

13.53 g of TEOS (tetraethylorthosilicate, $Si(OC_2H_5)_4$) was added to 24.22 g of a solution of nitric acid with a pH of 2, with the combination being allowed to hydrolyse, with stirring, at ambient temperature for 16 h. At the same time, 4.45 g of Pluronic P123 was added to 10.69 g of ethanol and 44.84 g of a solution of nitric acid with a pH of 2, with the combination also being stirred at ambient temperature for 16 h. The solution resulting from the hydrolysis of TEOS was then slowly added to the solution containing the dissolved P123. After 15 min of homogenization, it was sent in its entirety to the Buchi B290 spray drying apparatus. After spraying by means of the ultrasonic nozzle, the aerosol obtained was conveyed and dried by means of a vector gas (dry air) heated to 220° C. at the inlet. The harvested powder was oven dried in addition overnight at 100° C., then calcined in air for 12 h at T=400° C. The solid obtained was characterized by the following textural properties (by means of a nitrogen volumetric analysis): specific surface area $S_{BET}$=129 m$^2$/g, pore volume $V_p$=0.24 mL/g, and pore diameter (measured using the desorption branch of the isotherm) $\phi$=8.4 nm.

The solid obtained was then dry impregnated with an aqueous solution of cobalt nitrate, $Co(NO_3)_2$ (13.4% by weight of the element cobalt) to the pore volume without dilution. After oven drying for 12 hours at 120° C., the solid was calcined for 2 hours at 420° C. in a stream of air in a flushed bed type reactor. The steps of impregnation, drying and calcining were repeated twice. The non-activated catalyst E obtained contained 14.6% by weight of Co.

Example 6

Using the Catalysts A to E in the Fischer-Tropsch Synthesis

Before being tested in succession in the conversion of synthesis gas, the catalysts A to E were reduced ex situ in a stream of pure hydrogen at 400° C. for 16 hours in a tube reactor. Once the catalyst had been reduced, it was discharged under an atmosphere of argon and coated in Sasol-wax® so that it could be stored shielded from air prior to the test. The Fischer-Tropsch synthesis reaction was carried out in a continuously functioning slurry type reactor operating with a concentration of 10% (by volume) of catalyst in the slurry phase.

The test conditions were as follows: temperature=230° C.; total pressure=2 MPa; molar ratio $H_2/CO=2$. The conversion of CO was kept between 40% and 50% throughout the duration of the test. The test conditions were adjusted in a manner such as to be at iso-conversion of CO irrespective of the activity of the catalyst.

The results in terms of activity were calculated for catalysts A to E with respect to the catalyst E which acted as the reference and are shown in Table 1. The selectivities for the formation of methane are also given.

The results of Table 1 show the catalytic performances of catalysts A to E both in terms of activity and of selectivity. It appears that the catalysts in accordance with the invention, obtained with fewer unitary steps, had performances which were at least similar to the reference catalyst which was not in accordance with the invention.

TABLE 1

| Catalysts | Number of unitary steps of synthesis | Relative activity after 300 hours of test with a syngas feed | Selectivity for the formation of methane (%) |
|---|---|---|---|
| A (in accordance) | 4 | 312 | 9 |
| B (in accordance) | 4 | 286 | 7 |
| C (in accordance) | 4 | 175 | 6 |
| D (in accordance) | 5 | 127 | 8 |
| E (not in accordance) | 13 | 100 (base) | 11 |

The invention claimed is:

1. A process comprising synthesizing linear paraffinic hydrocarbons from a feed comprising carbon monoxide and hydrogen in the presence of a catalyst comprising a mesoporous oxide matrix and a content by weight of the element cobalt in the range 0.5% to 60%, expressed as the % by weight of metal with respect to the total weight of said catalyst, said process comprising preparing a catalyst by:
   a) mixing, in an aqueous or hydro-organic solvent, at least one molecular precursor comprising cobalt and at least one colloidal precursor of said mesoporous oxide matrix comprising at least one element X that is silicon, aluminium, titanium, zirconium, cerium or mixtures thereof, said molecular precursor comprising cobalt being dissolved in said aqueous or hydro-organic solvent;
   b) spray drying the mixture obtained in a) in order to result in the formation of spherical liquid droplets;
   c) drying said spherical droplets in order to obtain solid particles at a temperature in the range 10° C. to 300° C., said solid particles having
      a specific surface area of 60 to 200 m²/g,
      a pore volume of 0.3 to 0.8 mL/g and
      a pore diameter of 9 to 20 nm;
   d) activating said solid particles by means of a reduction treatment in a manner such as to form nanoparticles of cobalt with an oxidation state of 0 to produce a catalyst and subjecting said feed to synthesis conditions in the presence of the catalyst.

2. The process as claimed in claim 1, in which said mixture in accordance with said a) comprises colloidal precursors comprising the element silicon for only the colloidal precursors of said mesoporous oxide matrix.

3. The process as claimed in claim 1, in which said mixture in accordance with said a) comprises, for only the colloidal precursors of said mesoporous oxide matrix, colloidal precursors comprising the element silicon and colloidal precursors comprising the element aluminium, in a manner such that the silica content is in the range 0.5% to 95% by weight with respect to the total weight of said oxide matrix.

4. The process as claimed in claim 1, in which said mixture in accordance with a) also comprises at least one molecular precursor comprising at least one element Y that is silicon, aluminium, titanium, zirconium, cerium or mixtures thereof.

5. The process as claimed in claim 1, in which at least one element from groups VIIB, IA, IIA or IIIA, or at least one element Rh, Pd, Ag, Os, Ir, Pt, or Au, alone or as a mixture, is further added to the mixture of a) in a manner such that said catalyst comprises a content by weight of said at least one element in the range 20 ppm to 10%, expressed as a % by weight of the element with respect to the total weight of said catalyst.

6. The process as claimed in claim 1, in which the mixture in accordance with a) also comprises at least one surfactant.

7. The process as claimed in claim 1, in which said preparation process comprises c1) heat treatment of the solid particles obtained from c) and carried out upstream of d) at a temperature in the range 130° C. to 1000° C., for a period of less than 72 h.

8. The process as claimed in claim 1, in which said preparation process comprises c') hydrothermal treatment of the solid particles obtained from c) and carried out upstream of d), in steam at a temperature in the range 110° C. to 900° C., using an air/steam mixture, said mixture comprising in the range 2% to 80% (molar) of water in the form of steam.

9. The process as claimed in claim 7, in which said preparation process comprises c') hydrothermal treatment of the solid particles obtained from c1) and carried out upstream of d), in steam at a temperature in the range 110° C. to 900° C., using an air/steam mixture, said mixture comprising in the range 2% to 80% (molar) of water in the form of steam.

10. The process as claimed in claim 1, comprising, just before d), c") impregnation of the solid particles obtained with an aqueous or organic solution comprising at least one salt of a metal from group VIIIB that is cobalt, nickel, ruthenium or iron, and drying the product obtained at a temperature in the range 60° C. to 200° C.

11. The process as claimed in claim 10, in which at least one element from groups VIIB, IA, IIA or IIIA, or an element Rh, Pd, Ag, Os, Ir, Pt, or Au, alone or as a mixture, is further added during the impregnation c") in a manner such that said catalyst comprises a content by weight of said at least one element in the range 20 ppm to 10%, expressed as a % by weight of the element with respect to the total weight of said catalyst.

12. A process for the synthesis of paraffinic hydrocarbons as claimed in claim 1, in which the $H_2/CO$ molar ratio is in the range 0.5 to 4, operated at a total pressure in the range 0.1 to 15 MPa, at a temperature in the range 150° C. to 350° C., and at an hourly space velocity in the range 100 to 20000 volumes of feed per volume of catalyst per hour.

* * * * *